E. C. RITCHELL.
LARD PAIL.
APPLICATION FILED APR. 20, 1908.
1,029,029.
Patented June 11, 1912.
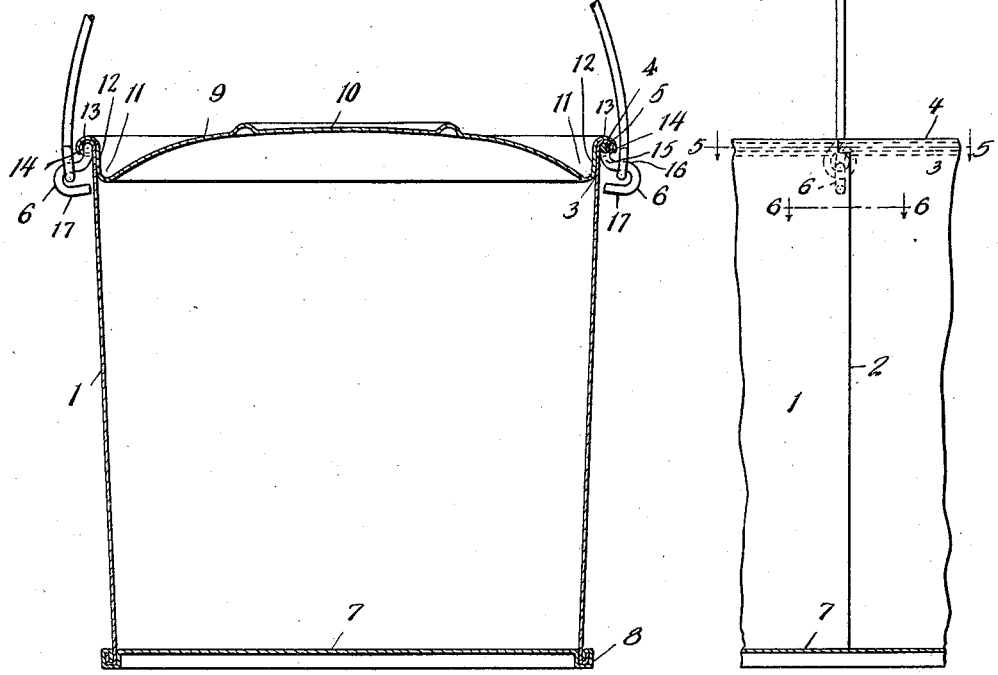
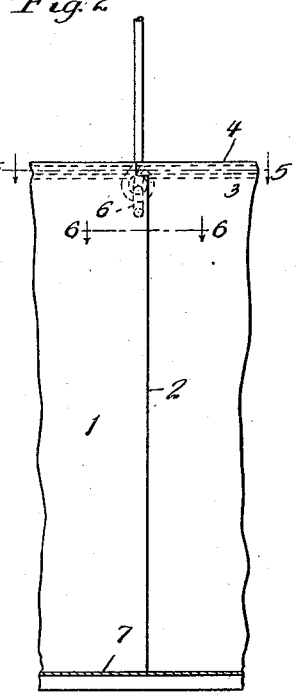
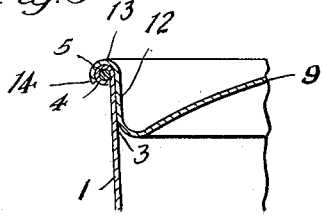
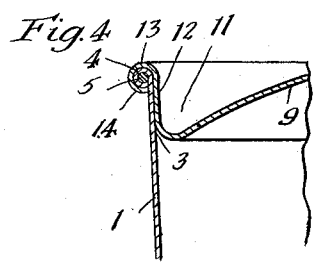
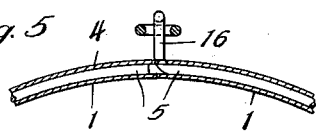
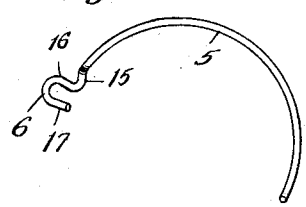
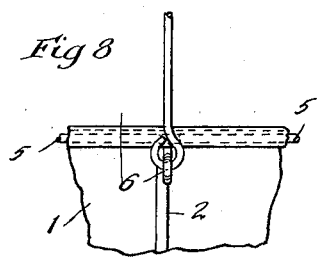
Witnesses:
Inventor
Edward C. Ritchell
By Munday, Evarts, Adcock & Clarke
Attorneys
COLUMBIA PLANOGRAPH CO., WASHINGTON, D. C.

UNITED STATES PATENT OFFICE.

EDWARD C. RITCHELL, OF ST. PAUL, MINNESOTA, ASSIGNOR TO AMERICAN CAN COMPANY, OF NEW YORK, N. Y., A CORPORATION OF NEW JERSEY.

LARD-PAIL.

1,029,029.   Specification of Letters Patent.   Patented June 11, 1912.

Application filed April 20, 1908. Serial No. 427,966.

*To all whom it may concern:*

Be it known that I, EDWARD C. RITCHELL, a citizen of the United States, residing in St. Paul, in the county of Ramsey and State of Minnesota, have invented a new and useful Improvement in Lard-Pails, of which the following is a specification.

My invention relates to improvements in sheet metal pails intended especially for shipment of lard.

The object of my invention is to provide a sheet metal pail of a cheap, simple, efficient and durable construction, in which the cover of the pail may be used either as a summer cover or as a winter cover, it having provision both for a friction closure connection and a crimped or locking closure connection with the body of the pail, and in which the bail ears of the pail may be so combined with the body of the pail and cover as not to interefere with either the friction closure or the crimped or locking closure connection of the cover with the pail.

My invention consists in a sheet metal pail comprising a body having a smooth, slightly flaring, friction seat wall at its upper end or mouth, and provided with an external annular roll embracing a reinforcing wire made in two segments or semicircular parts, each furnished at one end with a depending downwardly projecting hook-shaped bail eye, and a deeply countersunk inside fitting cover preferably furnished with a raised center, and having a friction seat wall tightly fitting and engaging the friction seat wall or mouth of the pail body, and also provided with an annular U-shaped rim adapted to snugly fit and engage the external roll of the body when the cover is used simply as a winter or friction fit cover, the lower portion or flange of said annular U-shaped rim being adapted to be crimped or bent under the annular roll on the body when the cover is desired for use as a summer cover, or to have a crimped or locking closure connection with the pail body in addition to a friction closure connection therewith.

In the accompanying drawing, forming a part of this specification, Figure 1 is a central vertical section of a sheet metal lard pail embodying my invention; Fig. 2 is a partial interior elevation, partly in vertical section; Fig. 3 is a detail vertical section showing the cover as used as a winter cover with friction closure only with the body; Fig. 4 is a similar view showing the cover as used for a summer cover with both friction cover connection and crimped or locking closure connection; Fig. 5 is a detail horizontal section on line 5—5 of Fig. 2; Fig. 6 is a detail section on line 6—6 of Fig. 2; Fig. 7 is a detail perspective view of one of the segmental or half round reinforcing wires; and Fig. 8 is a detail side elevation.

In the drawing 1 represents the body of the pail, the same being preferably of tin and having a lock or interfolded side seam 2 joining the meeting ends of the blank of which the body of the pail is formed. This lock side seam 2 is an external lock seam, preferably throughout its entire length. As the seam 2 is on the outside it gives the body of the pail a smooth inside friction seat wall 3 at its upper or mouth end so as to form a tight friction seat closure with the corresponding friction seat wall of the cover. At its upper end the body 1 is furnished with an integral external annular roll 4 which embraces the segmental reinforcing wires 5, each of which is furnished at one end with a downwardly projecting or depending integral bail eye lug or hook 6, preferably of a hook shape, substantially as shown in the drawing.

The bottom 7 of the pail is preferably secured to the lower end of the pail body 1 by an interfolded or double seam 8, so that the whole pail may be made without soldering, and thus be of an entirely sanitary construction.

The cover 9 is preferably furnished with a raised center 10 and with a deep countersink 11. The cover 9 is an inside fitting one and is furnished with a substantially upright, slightly flaring, friction seat wall 12, which by engagement with the interior smooth friction seat wall 3 of the pail body, forms a tight friction closure connection between the cover and the pail body. The cover 9 is also provided with an annular inverted U-shaped rim 13, which snugly fits and embraces the external annular roll 4 at the upper end of the pail body. The lower or flange portion 14 of the annular U-shaped rim 13 of the cover projects below the center of the external annular roll 4 of the pail body, so that when desired this depending portion 14 of the U-shaped rim 13 may be crimped or bent under the annular roll 4 of the pail body and thus form a crimped or locking connection between the cover and pail body, as illustrated in Fig. 4, when it is desired that the cover should have both a friction closure and a crimped or locking closure connection with the body of the pail for summer use.

As the bail eye lug or hook 6 of the segmental reinforcing wire 5 projects downwardly at 15, and then outwardly at 16 and then inwardly at 17, it does not interfere with the engagement of the external annular roll 4 on the body with the annular U-shaped rim 13 on the inside fitting cover 9. The raised center 10 of the cover is preferably substantially flush with the upper face of the annular U-shaped rim 13 of the cover. When the cover is crimped on, as shown in Fig. 4, the vessel is opened by cutting out of the cover or by unfolding the crimped under portion of the cover flange 14.

I claim:

1. In a sheet metal pail or vessel for lard or other articles, the combination with a pail body having a smooth interior friction seat wall at its upper end or mouth, and provided with an external continuous annular roll at its said upper end, of segmental reinforcing wires embraced by said annular roll on the pail body, and provided each at one end with a depending integral bail eye lug having a downwardly projecting portion 15, an outward bend 16 and an inward bend 17, and a depending countersunk inside fitting cover having a friction seat wall tightly engaging the friction seat wall of the body, and provided with an annular inverted U-shaped continuous rim snugly fitting and engaging said external annular roll of the body, the lower portion of said U-shaped rim of the cover projecting below the center of said annular roll on the body, substantially as specified.

2. In a sheet metal pail, the combination with a pail body circular in cross section and having a continuously annular roll at its upper end furnished with openings on its lower side and at diametrically opposite points, of a pair of separate piece, curved, segmental reinforcing wires adapted to be inserted endwise in the roll after the latter has been formed, and embraced by said roll and provided each at its outer end with a depending integral bail ear projecting at right angles downwardly from the roll, and having another portion projecting outwardly from said downwardly projecting portion, substantially as specified.

EDWARD C. RITCHELL.

Witnesses:
J. V. SLOCUM,
LEONARD C. SEAMER.

Copies of this patent may be obtained for five cents each, by addressing the "Commissioner of Patents, Washington, D. C."